(12) United States Patent
Lee et al.

(10) Patent No.: US 12,337,368 B2
(45) Date of Patent: Jun. 24, 2025

(54) APPARATUS FOR MANUFACTURING POUCH OF SECONDARY BATTERY

(71) Applicant: LG Energy Solution, Ltd., Seoul (KR)

(72) Inventors: Chung Hee Lee, Daejeon (KR); Se Young Oh, Daejeon (KR); Geun Hee Kim, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 247 days.

(21) Appl. No.: 18/025,084

(22) PCT Filed: Oct. 22, 2021

(86) PCT No.: PCT/KR2021/014931
§ 371 (c)(1),
(2) Date: Mar. 7, 2023

(87) PCT Pub. No.: WO2022/092719
PCT Pub. Date: May 5, 2022

(65) Prior Publication Data
US 2023/0321709 A1  Oct. 12, 2023

(30) Foreign Application Priority Data

Oct. 29, 2020 (KR) .......................... 10-2020-0142549
Jun. 8, 2021 (KR) .......................... 10-2021-0074475

(51) Int. Cl.
*B21D 22/02* (2006.01)
*B21D 45/06* (2006.01)

(52) U.S. Cl.
CPC ............. *B21D 22/02* (2013.01); *B21D 45/06* (2013.01)

(58) Field of Classification Search
CPC ........ B21D 22/02; B21D 22/20; B21D 24/02; B21D 24/04; B21D 24/10; B21D 45/06; B29C 51/262; B29C 51/082
See application file for complete search history.

(56) References Cited

U.S. PATENT DOCUMENTS 3,345,896 A * 10/1967 Bennett .................. B21D 37/10
                                                        83/637
5,706,696 A *  1/1998 Wagner .................. B21D 22/02
                                                        251/207

(Continued)

FOREIGN PATENT DOCUMENTS

JP    H11239999 A    9/1999
JP    2008212995 A   9/2008

(Continued)

OTHER PUBLICATIONS

International Search Report for PCT/KR2021/014931 mailed Jan. 25, 2022. 3 pgs.
EESR for Application No. 21886713.3 dated Feb. 22, 2024. 10 pgs.

*Primary Examiner* — Teresa M Ekiert
(74) *Attorney, Agent, or Firm* — Lerner David LLP

(57) ABSTRACT

An apparatus for manufacturing a pouch of a secondary battery according to the present invention includes a lower die having an accommodation groove for molding a cup part of the pouch on a base surface, on which the pouch is disposed, a punch inserted into the accommodation groove of the lower die to mode the cup part of the pouch, a stripper disposed above the lower die to face the lower die and provided to press a peripheral portion of the pouch, which is disposed around a portion to be molded into the cup part of the pouch by the punch, from an upper side, and a back plate coupled to the stripper and configured to support the stripper, wherein a protruding block protruding toward the stripper is provided on a surface (S) of surfaces of the back plate, which faces the stripper.

14 Claims, 8 Drawing Sheets

(56) References Cited

U.S. PATENT DOCUMENTS

| | | | |
|---|---|---|---|
| 8,128,859 B2 | 3/2012 | Dey et al. | |
| 2019/0259531 A1* | 8/2019 | Okudaria | B21D 28/00 |
| 2019/0366654 A1 | 12/2019 | Ueno et al. | |
| 2020/0153025 A1 | 5/2020 | Kim et al. | |
| 2020/0168853 A1 | 5/2020 | Kim et al. | |

FOREIGN PATENT DOCUMENTS

| | | |
|---|---|---|
| JP | 6237776 B2 | 11/2017 |
| JP | 2019209572 A | 12/2019 |
| KR | 101904094 B1 | 10/2018 |
| KR | 20190038094 A | 4/2019 |
| KR | 20200054054 A | 5/2020 |
| KR | 20200061034 A | 6/2020 |
| KR | 102145494 B1 | 8/2020 |
| KR | 20200117177 A | 10/2020 |

* cited by examiner

APPARATUS FOR MANUFACTURING POUCH OF SECONDARY BATTERY

CROSS-REFERENCE TO RELATED APPLICATION

The present application is a national stage entry under 35 U.S.C. § 371 of International Application No. PCT/KR2021/014931, filed on Oct. 22, 2021, which claims priority to Korean Patent Application Nos. 10-2020-0142549, filed on Oct. 29, 2020, and 10-2021-0074475, filed on Jun. 8, 2021, the disclosures of which are hereby incorporated by reference herein in their entireties.

TECHNICAL FIELD

The present invention relates to an apparatus for manufacturing a pouch of a secondary battery, and more particularly, to an apparatus for manufacturing a pouch of a secondary battery, in which, when a pressure for gripping a pouch base material is applied to mold the pouch, a higher pressure may be applied to a locally required area to relieve or remove pouch wrinkles without increasing in overall pressure, thereby improving molding quality of the pouch.

BACKGROUND ART

In recent years, the price of energy sources increases due to the depletion of fossil fuels, the interest in environmental pollution is amplified, and the demand for eco-friendly alternative energy sources is becoming an indispensable factor for future life. Accordingly, studies on various power generation technologies such as solar power, wind power, and tidal power are continuing, and power storage devices such as batteries for more efficiently using the generated electrical energy are also of great interest.

Furthermore, as technology development and demand for electronic mobile devices and electric vehicles using batteries increase, the demands for batteries as energy sources are rapidly increasing. Thus, many studies on batteries which are capable of meeting various demands have been conducted.

In particular, in terms of materials, there is a high demand for lithium secondary batteries such as lithium ion batteries and lithium ion polymer batteries having advantages such as high energy density, discharge voltage, and output stability.

The secondary batteries are classified into cylindrical batteries and prismatic batteries, in which an electrode assembly is embedded in a cylindrical or prismatic metal can, and pouch-type batteries, in which an electrode assembly is embedded in a pouch-type case made of an aluminum laminate sheet according to shapes of battery cases.

FIG. 1 illustrates an example of a pouch-type secondary battery. A pouch-type secondary battery 1 includes an electrode assembly 20, in which electrodes and separators are alternately stacked, and a pouch 10, into which the electrode assembly is inserted. In addition, the pouch includes cup parts 11 and 12 of the pouch, each of which has a recessed shape so that the electrode assembly is directly accommodated. The cup parts of the pouch are provided with the cup part 11 of a left pouch and the cup part 12 of a right pouch to surround the electrode assembly at both sides. A peripheral portion 14 of the pouch is formed around the periphery of each of the cup parts of the pouch to seal the pouch from the outside.

The pouch illustrated in FIG. 1 shows a pouch 10, in which two cup parts are formed on a flat pouch surface. The pouch having the above-described shape may be manufactured through an apparatus for manufacturing the pouch, which is formed as a molding die. However, when the pouch is molded using the molding die, there is a problem in that pouch wrinkles occurs due to the pouch base material being suctioned non-uniformly. In order to prevent this phenomenon, a method for increasing in overall pressure for gripping the pouch base material has been used. In this case, there is a risk of damage of the equipment and mold.

DISCLOSURE OF THE INVENTION

Technical Problem

The present invention has been devised to solve the above problems, and an object of the present invention is to provide an apparatus for manufacturing a pouch of a secondary battery, in which, when a pressure for gripping a pouch base material is applied to mold the pouch, a higher pressure may be applied to a locally required area to relieve or remove pouch wrinkles without increasing in overall pressure, thereby improving molding quality of the pouch.

Technical Solution

An apparatus for manufacturing a pouch of a secondary battery according to the present invention includes a lower die having an accommodation groove for molding a cup part of the pouch on a base surface, on which the pouch is disposed, a punch inserted into the accommodation groove of the lower die to mode the cup part of the pouch, a stripper disposed above the lower die to face the lower die and provided to press a peripheral portion of the pouch, which is disposed around a portion to be molded into the cup part of the pouch by the punch, from an upper side, and a back plate coupled to the stripper and configured to support the stripper, wherein a protruding block protruding toward the stripper is provided on a surface (S) of surfaces of the back plate, which faces the stripper.

A through-hole through which the punch passes may be formed in the back plate, and the protruding block may be disposed around the through-hole.

Two accommodation grooves, i.e., a left accommodation groove and a right accommodation groove may be formed in the lower die, the punch may include a left punch inserted into the left accommodation groove and a right punch inserted into the right accommodation groove, a left through-hole, through which the left punch passes, and a right through-hole, through which the right punch passes, may be formed in the back plate, and the protruding block may be disposed on a peripheral portion of each of the left through-hole and the right through-hole.

In a bottom view of the back plate, the protruding block may include: a first protruding block disposed above the through-hole of the back plate; and a second protruding block disposed below the through-hole of the back plate.

In a bottom view of the back plate, the protruding block may include: a third protruding block disposed at a left side of the through-hole of the back plate; and a fourth protruding block disposed at a right side of the through-hole of the back plate.

The protruding block may be provided in plurality, and based on a height measured from the surface (S) facing the stripper 130 among surfaces of the back plate, the protruding blocks may include protruding blocks having different heights when compared to other protruding blocks among the plurality of protruding blocks.

The back plate may include an intermediate rib part disposed between the left through-hole and the right through-hole, and the protruding block disposed above or below the intermediate rib part among the protruding blocks may be formed to have a height higher than that of each of other protruding blocks adjacent to the protruding block.

In the protruding blocks, the protruding block formed at a position adjacent to an outer corner of the left through-hole and the right through-hole may be formed to have a height higher than that of each of other protruding blocks adjacent thereto.

An insertion hole may be formed in the back plate, and the protruding block may be inserted into the insertion hole.

The protruding block may be provided in a cylindrical shape, and the insertion hole may have a circular hole shape corresponding to the shape of the protruding block.

A first screw thread may be formed on an inner circumferential surface of the insertion hole of the back plate, and a second screw thread having a shape corresponding to the first screw thread may be formed on an outer circumferential surface of the protruding block.

The protruding block may be screw-coupled to the insertion hole, and as a degree to which the protruding block is screw-coupled to the insertion hole is adjusted, a protruding height of the protruding block may be adjusted.

The protruding block may be made of a material comprising steel.

The protruding block may be made of a material having elasticity.

Advantageous Effects

The apparatus for manufacturing the pouch of the secondary battery according to the present invention may include the lower die having the accommodation groove for molding the cup part of the pouch on the base surface, on which the pouch is disposed, the punch inserted into the accommodation groove of the lower die to mode the cup part of the pouch, the stripper disposed above the lower die to face the lower die and provided to press the peripheral portion of the pouch, which is disposed around the portion to be molded into the cup part of the pouch by the punch, from the upper side, and the back plate coupled to the stripper and configured to support the stripper, wherein the protruding block protruding toward the stripper may be provided on the surface (S) of surfaces of the back plate, which faces the stripper. Therefore, when the pressure for gripping the pouch base material is applied to mold the pouch, the higher pressure may be applied to the locally required area to relieve or remove the pouch wrinkles without increasing in overall pressure, thereby improving the molding quality of the pouch.

MODE FOR CARRYING OUT THE INVENTION

Figure 1:
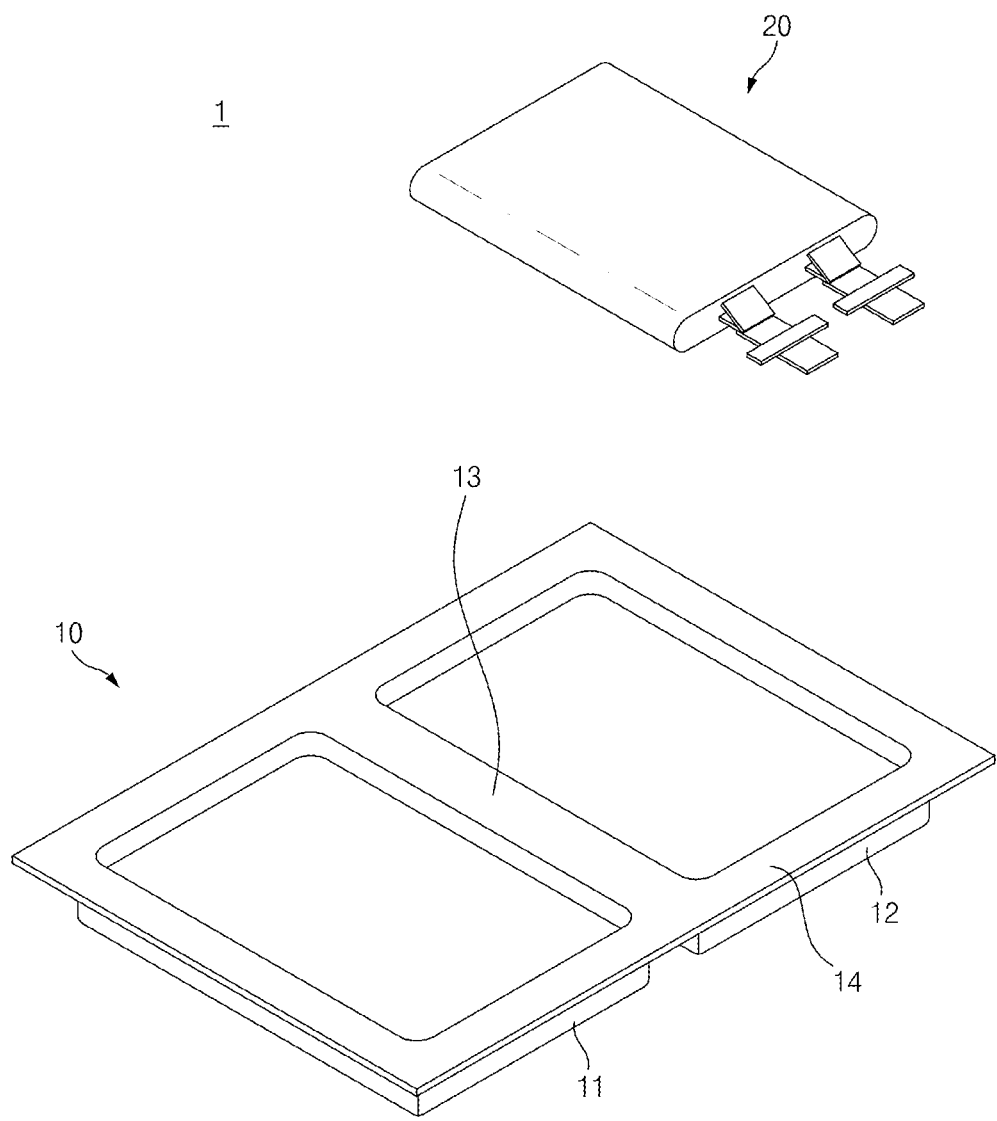
FIG. 1 is an exploded perspective view of a pouch of a secondary battery and an electrode assembly, which is embedded in the pouch.

Hereinafter, preferred embodiments of the present invention will be described in detail with reference to the accompanying drawings so that those of ordinary skill in the art can easily carry out the present invention. However, the present invention may be implemented in several different forms and is not limited or restricted by the following examples.

In order to clearly explain the present invention, detailed descriptions of portions that are irrelevant to the description or related known technologies that may unnecessarily obscure the gist of the present invention have been omitted, and in the present specification, reference symbols are added to components in each drawing. In this case, the same or similar reference numerals are assigned to the same or similar elements throughout the specification.

Also, terms or words used in this specification and claims should not be restrictively interpreted as ordinary meanings or dictionary-based meanings, but should be interpreted as meanings and concepts conforming to the scope of the present invention on the basis of the principle that an inventor can properly define the concept of a term to describe and explain his or her invention in the best ways.

Embodiment 1

Figure 2:
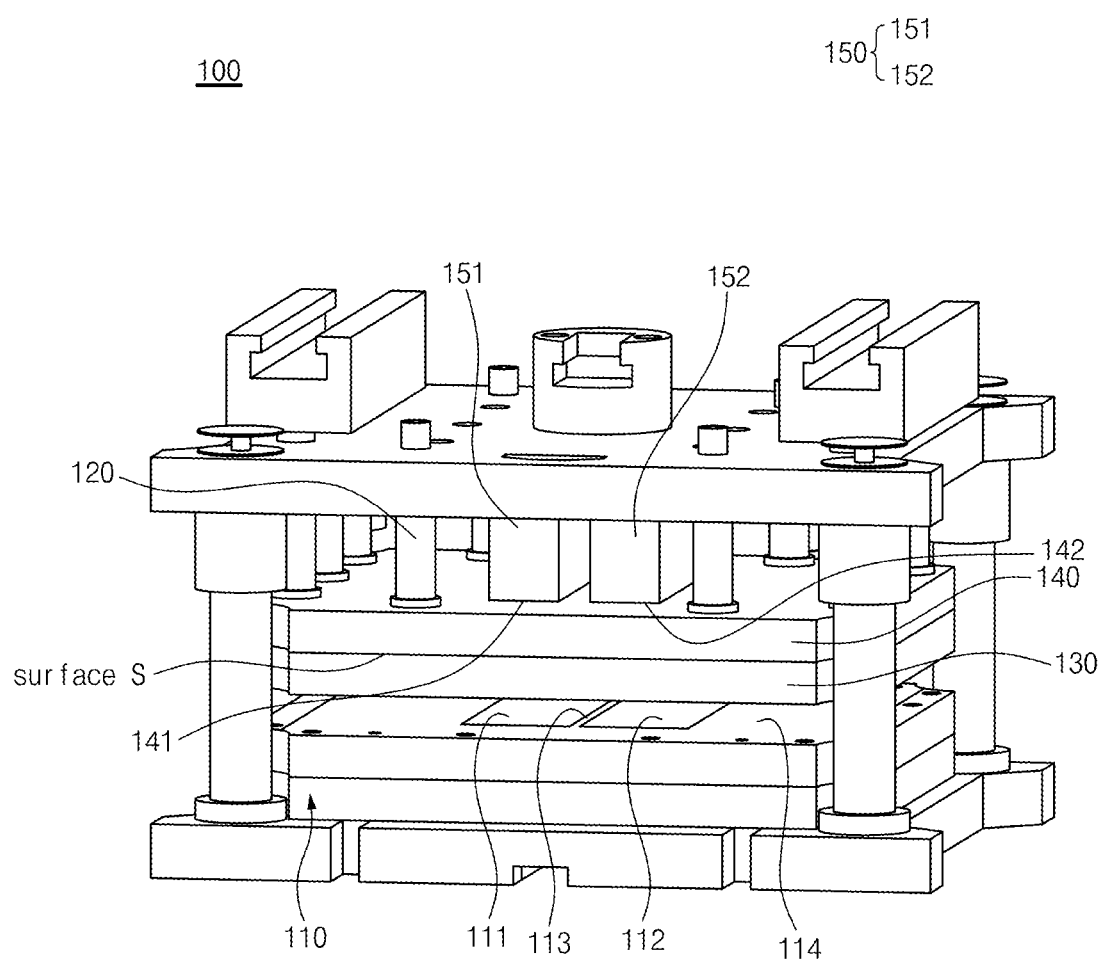
FIG. 2 is a perspective view of an apparatus for manufacturing a pouch of a secondary battery according to Embodiment 1 of the present invention.
Figure 3:
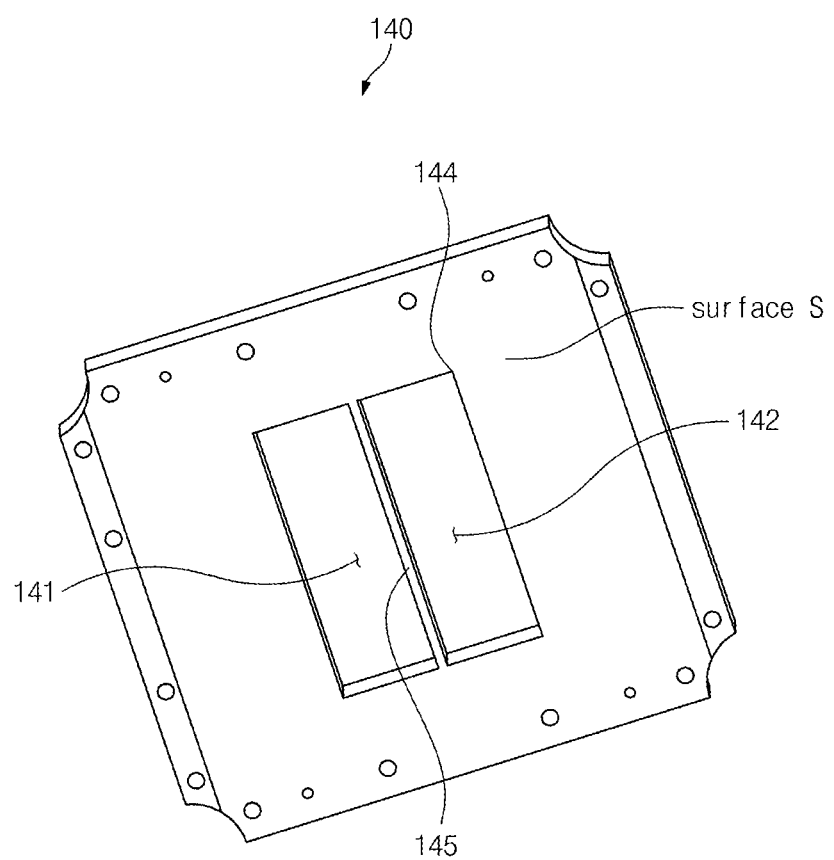
FIG. 3 is a perspective view of a back plate having no protruding block in the apparatus for manufacturing the pouch of the secondary battery according to Embodiment 1 of the present invention.
Figure 4:
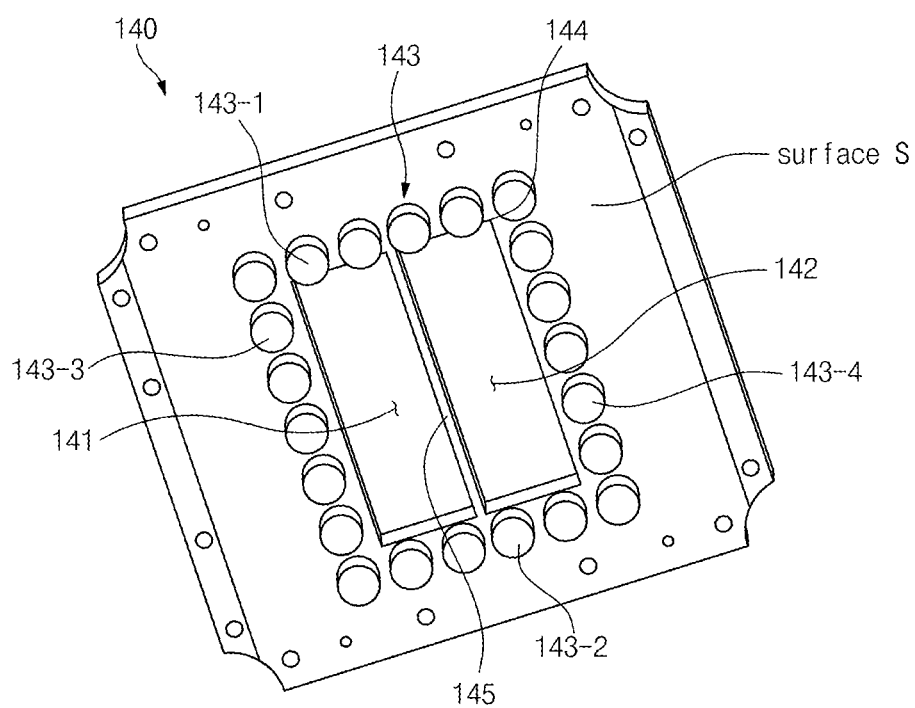
FIG. 4 is a perspective view of a back plate having a protruding block in the apparatus for manufacturing the pouch of the secondary battery according to Embodiment 1 of the present invention.
Figure 5:
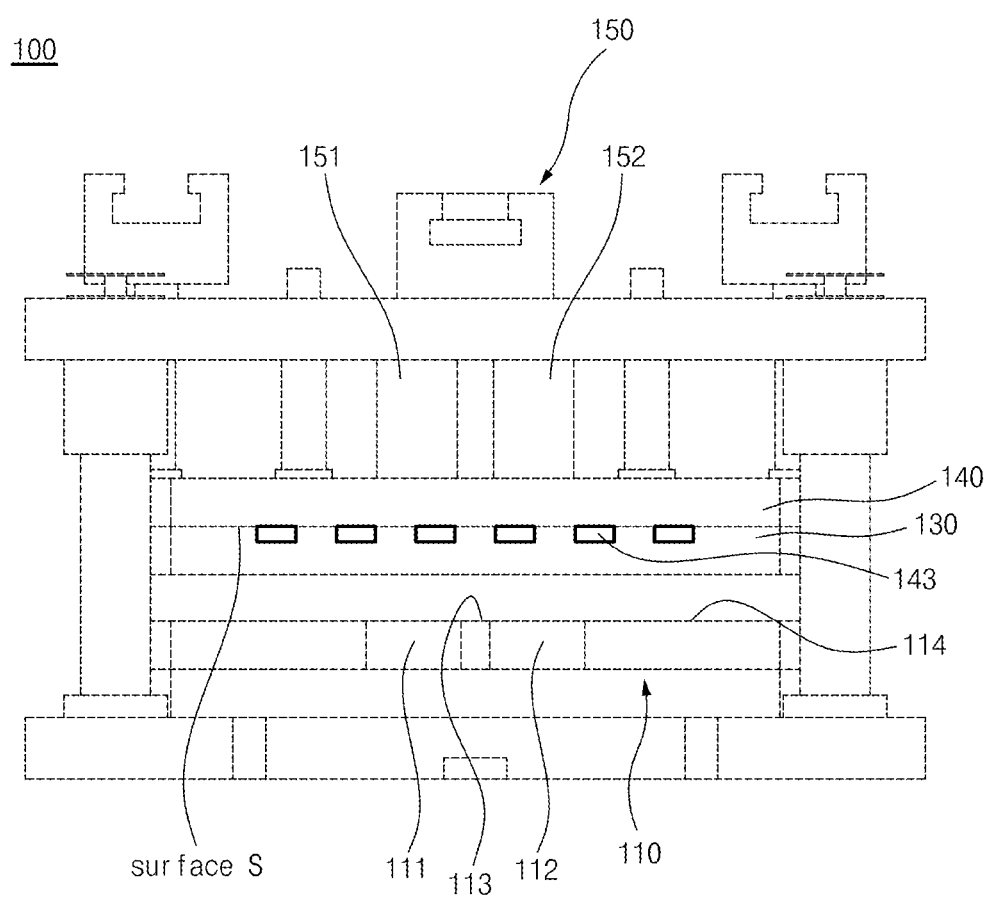
FIG. 5 is a side perspective view of the apparatus for manufacturing the pouch of the secondary battery according to Embodiment 1 of the present invention.

FIG. 2 is a perspective view of an apparatus for manufacturing a pouch of a secondary battery according to Embodiment 1 of the present invention. FIG. 3 is a perspective view of a back plate having no protruding block in an apparatus for manufacturing a pouch of a secondary battery according to Embodiment 1 of the present invention. FIG. 4 is a perspective view of a back plate having a protruding block in the apparatus for manufacturing the pouch of the secondary battery according to Embodiment 1 of the present invention. FIG. 5 is a side perspective view of the apparatus for manufacturing the pouch of the secondary battery according to Embodiment 1 of the present invention.

Referring to FIGS. 2 to 5, an apparatus 100 for manufacturing a pouch of a secondary battery according to Embodiment 1 of the present invention includes a lower die 110, a punch 150, a stripper 130, and a back plate 140.

The lower die 110 may be disposed below to mold the pouch and may have a base surface 114, on which the pouch is disposed, on an upper portion thereof. In addition, the lower die 110 has accommodation grooves 111 and 112 for molding a cup part of the pouch on the base surface 114 on which the pouch is disposed. The punch 150 may be configured to mold the cup part of the pouch while being inserted into the accommodation grooves of the lower die 110. The stripper 130 may be configured to press a peripheral portion 14 of the pouch, which is disposed in the periphery of a portion to be molded into the cup part of the pouch, from an upper side by the punch 150. For this, the stripper 130 may be disposed above a lower die 110 to face the lower die 110.

The stripper 130 and the lower die 110 may grip upper and lower portion of the peripheral portion of the pouch, respectively, and in the state in which the peripheral portion of the pouch is gripped by the stripper 130 and the lower die 110, the punch 150 may be inserted into the accommodation grooves to mold the cup part of the pouch.

Two accommodation grooves, i.e., a left accommodation groove 111 and a right accommodation groove 112 may be formed in the lower die 110. A cup part 11 of the left pouch may be formed through the left accommodation groove 111, and a cup part 12 of the right pouch may be formed through the right accommodation groove 112. A bridge part 113 connecting the two accommodation grooves to each other may be formed between the left accommodation groove 111 and the right accommodation groove 112.

The back plate 140 is configured to be coupled to the stripper 130 and may serve to support the stripper 130. As illustrated in FIG. 2, the back plate 140 may be connected to a support rod 120 and may be installed to be movable vertically. Also, the stripper 130 and the back plate 140 may be coupled to each other using a screw. The stripper 130 and the back plate 140 may move as one body because of being coupled to each other using the screw. Thus, the stripper 130 may move vertically together with the back plate 140 when the back plate 140 moves vertically.

In addition, referring to FIGS. 2 to 4, the apparatus 100 for manufacturing the pouch of the secondary battery according to Embodiment 1 of the present invention is provided with a protruding block 143 that protrudes toward the stripper 130 on a surface S, which faces the stripper 130, of surfaces of the back plate 140. A through-hole through which the punch 150 passes is formed in the back plate 140, and the protruding block 143 may be disposed around the through-hole.

In the apparatus 100 for manufacturing the pouch of the secondary battery according to Embodiment 1 of the present invention, which is provided as the above-described configuration, when a pressure for gripping the pouch base material is applied to mold the pouch, a higher pressure may be applied to a locally required area to relieve or remove pouch wrinkles without increasing in overall pressure, thereby improving molding quality of the pouch.

That is, a peripheral portion of the through-hole may be an area corresponding to a portion that presses the peripheral portion of the pouch. If the protruding block 143 is formed at the portion, an area on which the protruding block 143 may press the pouch base material at a pressure higher than that applied to the peripheral area thereof. Even when the overall back plate 140 is pressed at the same pressure as in the prior art, the pouch base material may be pressed and gripped at the portion at which the protruding block 143 is disposed at a pressure higher than the peripheral area. Thus, if there is a portion at which the pouch base material is relatively more suctioned, when the protruding block 143 is disposed at the portion, the portion that is more suctioned may not be suctioned to relieve or remove pouch wrinkles without an overall increase in pressure, thereby improving molding quality of the pouch.

If the pressure applied by the back plate 140 increase as a whole to prevent the phenomenon, in which the pouch base material is partially more suctioned, from occurring, the wrinkle phenomenon may be improved, but in this case, another problem that is difficult to be solved may occur because damage of the equipment and mold occurs.

In the apparatus 100 for manufacturing the pouch of the secondary battery according to Embodiment 1 of the present invention, two accommodation grooves, i.e., a left accommodation groove 111 and a right accommodation groove 112 may be formed in the lower die 110, and the punch 150 may include a left punch 151 inserted into the left accommodation groove 111 and a right punch 152 inserted into the right accommodation groove 112. In addition, a left through-hole 141, through which the left punch 151 passes, and a right through-hole 142, through which the right punch 152 passes, may be formed in the back plate 140. In this case, the protruding block 143 may be disposed at a peripheral portion of each of the left through-hole 141 and the right through-hole 142.

Specifically, referring to FIG. 4, in the bottom view of the back plate 140, the protruding block 143 may include a first protruding block 143-1 disposed above the through-hole of the back plate 140 and a second protruding block 143-2 disposed below the through-hole of the back plate 140.

In addition, the protruding block 143 may include a third protruding block 143-3 disposed at a left side of the through-hole of the back plate 140 and a fourth protruding block 143-4 disposed at a right side of the through-hole of the back plate 140.

Also, the protruding block 143 is provided in plurality. Here, based on a height measured from a surface S facing the stripper 130 among the surfaces of the back plate 140, protruding blocks 143 having different heights when compared to other protruding blocks 143 among the plurality of protruding blocks 143 may be provided.

For example, the protruding block 143 disposed above or below an intermediate rib part 145 among the protruding blocks 143 may be formed to have a height higher than that of each of other protruding blocks 143 adjacent to the protruding block 143. Here, the intermediate rib part 145 may be a portion disposed between the left through-hole 141 and the right through-hole 142 and also may be a portion that divides the left through-hole 141 and the right through-hole 142 into each other.

Since the intermediate rib part 145 is an area corresponding to the bridge part 113 of the lower die 110, when the protruding block 143 is provided higher at an upper or lower side of the intermediate rib part 145, a relatively higher pressing pressure may be applied to the peripheral area of the pouch, which is disposed above or below the bridge part 113, rather than the peripheral area.

In general, since the pouch base material is more suctioned into the upper or lower side of the bridge part 113 of the lower die 110 to cause the wrinkles, when the protruding block 143 is provided higher at the upper or lower side of the intermediate rib part 145, the phenomenon, in which the pouch base material is more suctioned at the upper or lower side of the bridge part 113, may be prevented from occurring to prevent the wrinkles from occurring.

In addition, the protruding block 143, which is formed at a position adjacent to an outer corner of each of the left through-hole 141 and the right through-hole 142 of the back plate 140, among the protruding blocks 143 may be formed higher than each of other protruding blocks adjacent thereto.

For example, the protruding block 143 formed at a position adjacent to an upper right outer corner 144 of the right through-hole 142 may be formed to have a height higher than that of each of other protruding blocks adjacent thereto. In the same manner, the protruding block 143 formed at a position adjacent to an lower right outer corner 144 of the right through-hole 142 may be formed to have a height higher than that of each of other protruding blocks adjacent thereto. This may be similarly applied to the upper left and lower left corners of the left through-hole 141.

In general, since an outer corner area of the pouch is an area into which the pouch base material is more suctioned, when the protruding block 143 disposed adjacent to the corner has a higher height than each of the peripheral protruding block 143, the wrinkles occurring at the corresponding portion may be prevented from occurring.

Also, the protruding block 143 may be made of a material including steel. Thus, the protruding block may have rigidity and effectively exert pressing force. In addition, the protruding block may be made of a material having elasticity. If the protruding block has the elasticity, the stripper 130 and the back plate 140 may be more easily coupled to each other.

FIG. 5 is a side perspective view illustrating a state in which the protruding block 143 is installed in the apparatus 100 for manufacturing the pouch of the secondary battery according to Embodiment 1 of the present invention. Since the protruding block 143 is a structure installed therein, the protruding block 143 is not illustrated in the perspective view of FIG. 2, and a position and configuration of the protruding block 143 may be confirmed as a whole through the side perspective view of FIG. 5. A state in which the protruding block 143 protrudes from a surface S of the back plate 140 to locally press the stripper 130 is illustrated through FIG. 5. In FIG. 5, for convenience, the protruding block 143 is illustrated as being inserted into the stripper 130, but it is drawn so that the protruding block is seen well. That is, the protruding block 143 is not inserted into the stripper 130, but the protruding block 143 presses the stripper 130 in a state of being pressed.

Embodiment 2

Figure 6:
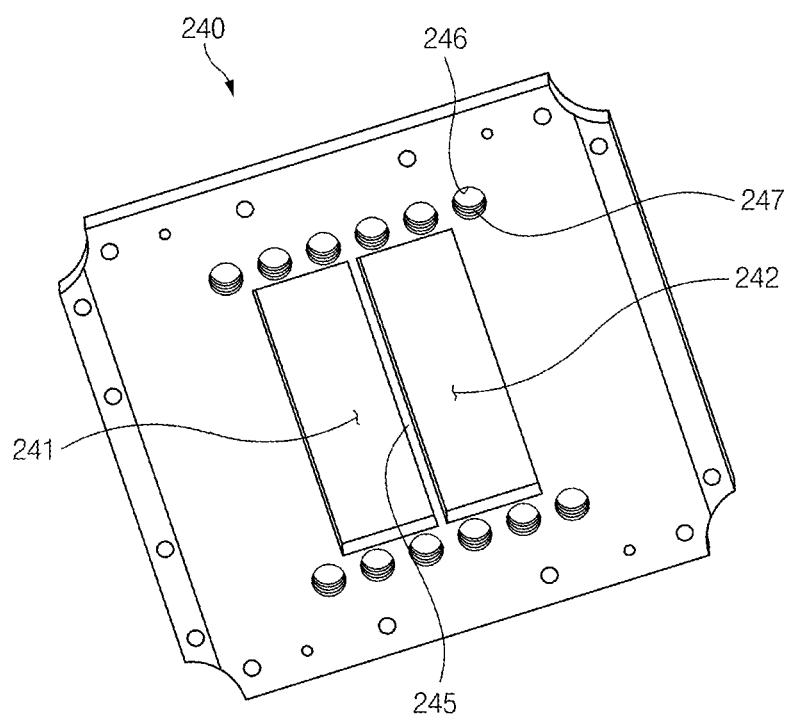
FIG. 6 is a perspective view of a back plate having no protruding block in an apparatus for manufacturing a pouch of a secondary battery according to Embodiment 2 of the present invention.
Figure 7:
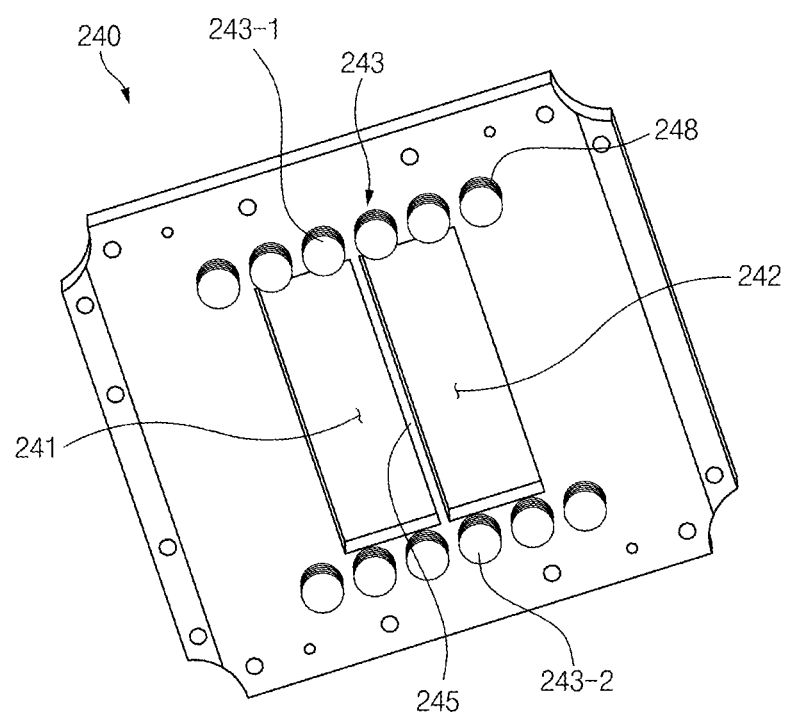
FIG. 7 is a perspective view of a back plate having a protruding block in the apparatus for manufacturing the pouch of the secondary battery according to Embodiment 2 of the present invention.
Figure 8:
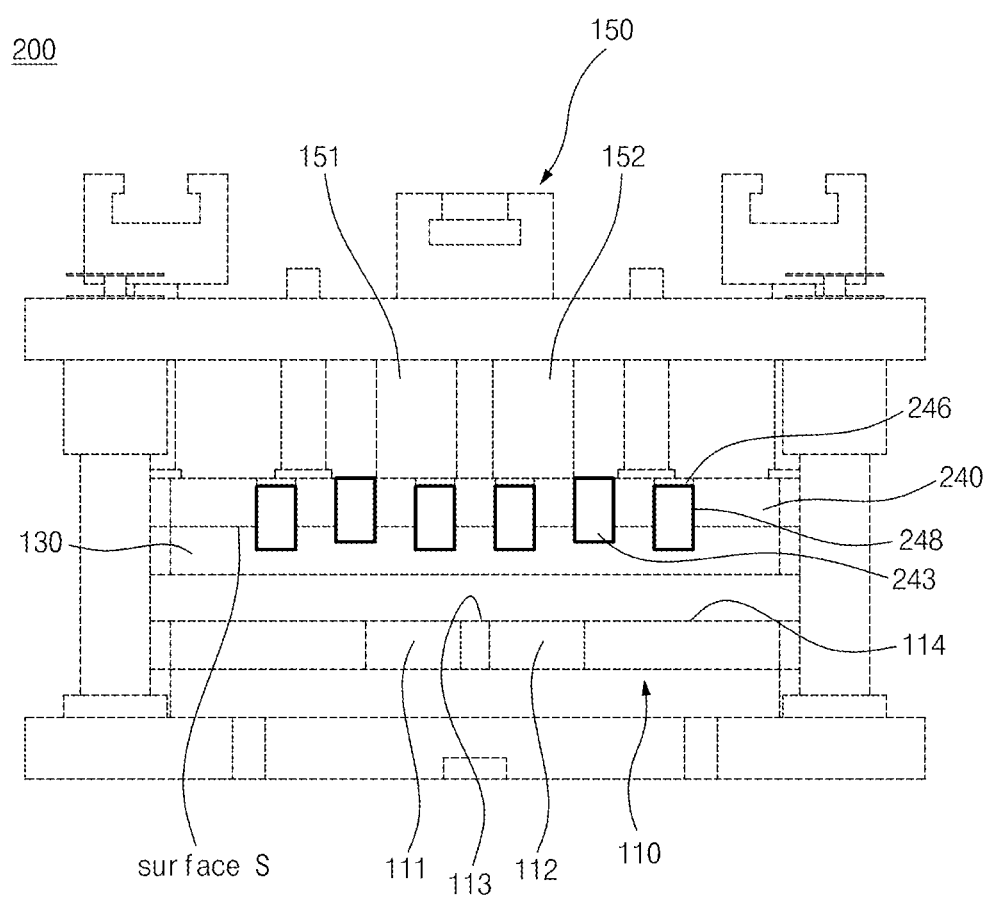
FIG. 8 is a side perspective view of the apparatus for manufacturing the pouch of the secondary battery according to Embodiment 2 of the present invention.

FIG. 6 is a perspective view of a back plate having no protruding block in the apparatus for manufacturing the pouch of the secondary battery according to Embodiment 2 of the present invention. FIG. 7 is a perspective view of a back plate having a protruding block in the apparatus for manufacturing the pouch of the secondary battery according to Embodiment 2 of the present invention. FIG. 8 is a side perspective view of the apparatus for manufacturing the pouch of the secondary battery according to Embodiment 2 of the present invention.

In Embodiment 2 of the present invention, a method in which a protruding block 243 is installed on a back plate 240 is different from that in Embodiment 1.

The contents that are duplicated with Embodiment 1 will be omitted as much as possible, and Embodiment 2 will be described with a focus on the differences. That is, it is obvious that the contents that are not described in Embodiment 2 may be regarded as the contents of Embodiment 1 if necessary.

Referring to FIGS. 6 and 7, in the apparatus for manufacturing the pouch of the secondary battery according to Embodiment 2 of the present invention, an insertion hole 246 may be formed in the back plate 240, and the protruding block 243 may be inserted into the insertion hole 246. The protruding block 243 may be provided in a cylindrical shape, and the insertion hole 246 may have a circular hole shape to correspond to the shape of the protruding block 243.

A first screw thread 247 may be formed on an inner circumferential surface of the back plate 240 of the insertion hole 246, and a second screw thread 248 having a shape corresponding to the first screw thread 247 may be formed on an outer circumferential surface of the protruding block 243. Also, the protruding block 243 may be screw-coupled to the insertion hole 246, and as a degree to which the protruding block 243 is screw-coupled to the insertion hole 246 is adjusted, a protruding height of the protruding block 243 may be adjusted.

Specifically, in the bottom view of the back plate 240 according to Embodiment 2, the protruding block 243 may include a first protruding block 243-1 disposed above the through-hole of the back plate 240 and a second protruding block 243-2 disposed below the through-hole of the back plate 240. Unlike Embodiment 1, the protruding block 243 may not include a third protruding block 243 disposed on a left side of a through-hole of the back plate 240 and a fourth protruding block 243 disposed on a right side of a through-hole of the back plate 240.

The protruding block 243 may be provided in plurality. In addition, the protruding block 243 disposed adjacent above or below an intermediate rib part 245 among the protruding blocks 243 may be formed to have a height higher than that of each of other protruding blocks 243 adjacent to the protruding block 143. Thus, a pouch area disposed adjacent to the upper and lower sides of the bridge part 113 of the lower die 110 may be pressed more strongly locally to prevent the pouch wrinkles on the region on which the wrinkles occur.

In embodiment 2, each of the insertion hole 246 and the screw method is applied as a means for adjusting the height so that the protruding block 243 increases in height. As a result, the height of the protruding block 243 may be adjusted only by simply turning the protrude block 243. Also, since each of the plurality of protruding blocks 243 is individually screw-coupled, the height of each of the protruding blocks 243 may be individually adjusted. Thus, it is possible to finely and locally adjust the pressure to increase on the required area, thereby realizing more precisely and superior products.

FIG. 8 is a side perspective view illustrating a state in which the protruding block 243 is installed in the apparatus for manufacturing the pouch of the secondary battery according to Embodiment 2 of the present invention. Since the protruding block 243 is a structure installed therein, a position and configuration of the protruding block 143 may be confirmed as a whole through the side perspective view of FIG. 8. In FIG. 8, the protruding block 243 may pass through the insertion hole 246 of the back plate 240 and then be screw-coupled, and also, the protruding block 243 may protrude in a direction of the stripper 130 with respect to the surface S to locally press the stripper 130. FIG. 8 illustrates that the plurality of protruding blocks 243 protrude to different heights as needed. However, for clear distinction, the degree of protrusion of each of the protruding blocks may be shown in the drawings to be exaggerated than in reality.

Like Embodiment 1, the protruding block 243 may be made of a material including steel. In addition, the protruding block may be made of a material having elasticity.

While the embodiments of the present invention have been described with reference to the specific embodiments, it will be apparent to those skilled in the art that various changes and modifications may be made without departing from the spirit and scope of the invention as defined in the following claims.

DESCRIPTION OF THE SYMBOLS

1: Secondary battery
10: Pouch
11: Cup part of left pouch
12: Cup part of right pouch
13: Pouch bridge part
14: Peripheral portion of pouch
20: Electrode assembly
100, 200: Apparatus for manufacturing pouch of secondary battery
110: Lower die
111: Left accommodation groove
112: Right accommodation groove
113: Bridge part
114: Base surface
120: Support rod
130: Stripper
140, 240: Back plate
141, 241: Left through-hole
142, 242: Right through-hole
143, 243: Protruding block
143-1, 243-1: First protruding block
143-2, 243-2: Second protruding block
143-3: Third protruding block
143-4: Fourth protruding block
144: Upper right outer cover
145, 245: Intermediate rib
246: Insertion hole
247: First screw thread
248: Second screw thread
150: Punch
151: Left punch
152: Right punch

The invention claimed is:

1. An apparatus for manufacturing a pouch of a secondary battery, the apparatus comprising:
    a lower die having an accommodation groove extending below a base surface thereof, the accommodation groove being configured to mold a cup part of the pouch;
    a punch configured to be inserted into the accommodation groove of the lower die to mold the cup part of the pouch;
    a stripper disposed above the lower die and facing the lower die, the stripper being configured to press a peripheral portion of the pouch disposed on the base surface of the lower die outside of the accommodation groove; and
    a back plate coupled to the stripper and configured to support the stripper, the back plate having one or more protruding blocks protruding toward the stripper from a surface of the back plate that faces the stripper.

2. The apparatus of claim 1, wherein the back plate has a through-hole defined therein, the through hole configured to receive the punch passing therethrough, and the one or more protruding blocks are arranged around the through-hole.

3. The apparatus of claim 2, wherein the accommodation groove comprises a left accommodation groove and a right accommodation groove extending into the lower die,
    the punch comprises a left punch configured to be inserted into the left accommodation groove and a right punch configured to be inserted into the right accommodation groove,
    the through-hole of the back plate comprises a left through-hole configured to receive the left punch passing therethrough, and a right through-hole configured to receive the right punch passing therethrough, and
    the one or more protruding blocks are disposed on the back plate adjacent to a peripheral portion of each of the left through-hole and the right through-hole.

4. The apparatus of claim 2, wherein the one or more protruding blocks comprise:
    a first protruding block disposed adjacent to a first side of the through-hole of the back plate; and
    a second protruding block disposed adjacent to a second side the through-hole of the back plate, the second side being opposite from the first side.

5. The apparatus of claim 4, wherein the one or more protruding blocks comprise:
    a third protruding block disposed adjacent to a third side of the through-hole of the back plate; and
    a fourth protruding block disposed adjacent to a fourth side of the through-hole of the back plate, the fourth side being opposite from the third side, the third and fourth sides each extending between the first and second sides.

6. The apparatus of claim 2, wherein the one or more protruding blocks comprise a first group of the protruding blocks protruding to different heights from the surface of the back plate compared a second group of the protruding blocks.

7. The apparatus of claim 3, wherein the back plate comprises an intermediate rib part disposed between the left through-hole and the right through-hole, and a first group of the one or more protruding blocks disposed adjacent to first or second ends of the intermediate rib part protrudes farther from the surface of the back plate than each of other ones of the protruding blocks adjacent to the first group of the one or more protruding blocks.

8. The apparatus of claim 3, wherein a first group of the one or more protruding blocks disposed adjacent to an outer corner of the left through-hole and an outer corner of the right through-hole protrudes farther from the surface of the back plate than each of other ones of the protruding blocks adjacent to the first group of the one or more protruding blocks.

9. The apparatus of claim 1, wherein the back plate has an insertion hole defined therein, and a first end of a first protruding block of the one or more protruding blocks is inserted into the insertion hole.

10. The apparatus of claim 9, wherein the first protruding block has a cylindrical shape, and the insertion hole has a circular hole shape that is complementary to the cylindrical shape of the first protruding block.

11. The apparatus of claim 10, wherein a first screw thread is formed on an inner circumferential surface of the insertion hole of the back plate, and a second screw thread having a shape that is configured to engage with the first screw thread is formed on an outer circumferential surface of the first protruding block.

12. The apparatus of claim 11, wherein the first protruding block is screw-coupled to the insertion hole such that a rotation of the first protruding block relative to the insertion hole will increase or decrease a protruding height of a second end of the first protruding block relative to the surface of the back plate.

13. The apparatus of claim 1, wherein each of the one or more protruding blocks is made of a material comprising steel.

14. The apparatus of claim 13, wherein each of the one or more protruding blocks is made of a material having elasticity.

* * * * *